United States Patent [19]

Tippets

[11] Patent Number: 5,381,939
[45] Date of Patent: Jan. 17, 1995

[54] VEHICLE CARGO CARRIER

[76] Inventor: Clyde A. Tippets, 3046 Lampman Dr., Billings, Mont. 59102

[21] Appl. No.: 99,447

[22] Filed: Jul. 30, 1993

[51] Int. Cl.⁶ .............................................. B60R 9/00
[52] U.S. Cl. ........................... 224/42.07; 224/42.08 R; 224/309; 224/319; 224/324
[58] Field of Search ................ 224/42.07, 42.05, 319, 224/42.08 R, 42.08 A, 309, 317, 324, 325

[56] References Cited

U.S. PATENT DOCUMENTS

| | | | |
|---|---|---|---|
| 1,641,502 | 9/1927 | Price | 224/42.07 X |
| 2,492,841 | 12/1949 | Burkey | 224/42.03 |
| 2,779,524 | 1/1957 | Carlson | 224/42.07 |
| 3,260,929 | 7/1966 | Hedgepath | 224/42.07 |
| 3,300,111 | 1/1967 | Hedgepath | 224/42.07 |
| 3,902,642 | 9/1975 | McNeece | 224/42.08 R |
| 4,406,384 | 9/1983 | Schantz | 224/42.07 |
| 5,215,234 | 6/1993 | Pasley | 224/42.07 X |
| 5,219,106 | 6/1993 | Glunt | 224/42.07 |

FOREIGN PATENT DOCUMENTS 1004722 4/1952 France .......................... 224/319

*Primary Examiner*—Henry J. Recla
*Assistant Examiner*—David J. Walczak
*Attorney, Agent, or Firm*—Risto A. Rinne, Jr.

[57] ABSTRACT

A vehicle cargo carrier structure is disclosed as including a rear supporting bumper having two upright members attached thereto and extending above the supporting bumper to a predetermined height, that is for most types of vehicles, in excess of the roof height of the vehicle. A connecting member is disposed between a first end of each of the upright members that is opposite to where each upright member is attached to the supporting bumper and is attached thereto. A pair of upper support members are included wherein a first end of each is attached to the first end of each of the upright members. A front connecting member is attached to each of the upper support members at a second end of each and is disposed parallel with the connecting member and is separated therefrom by the length of the upper support members. The connecting member, the front connecting member, and the two upper support members define in general a rectangular area that is disposed substantially on the same plane. According to a modification, a luggage rack is provided that is attachable to and detachable apart from the improved vehicle cargo carrier.

13 Claims, 2 Drawing Sheets

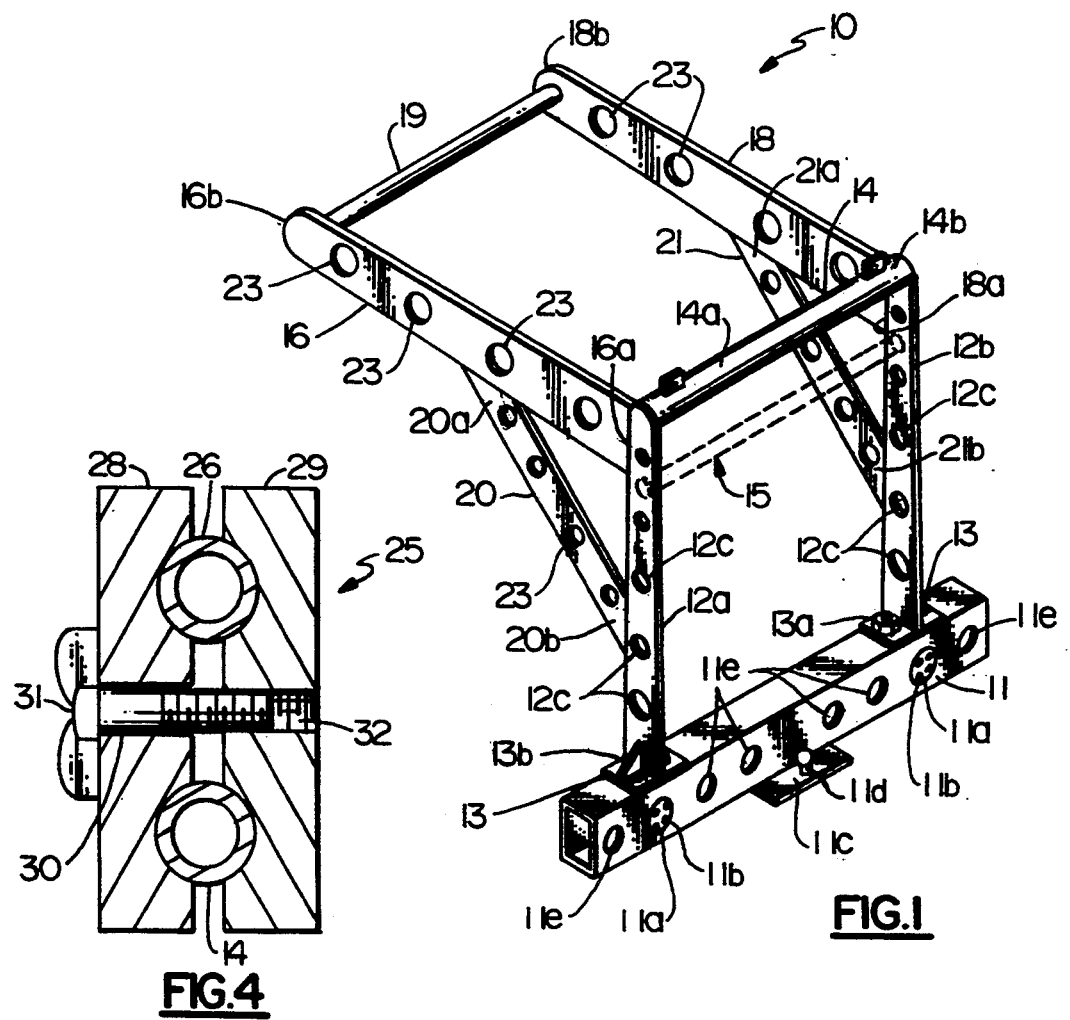
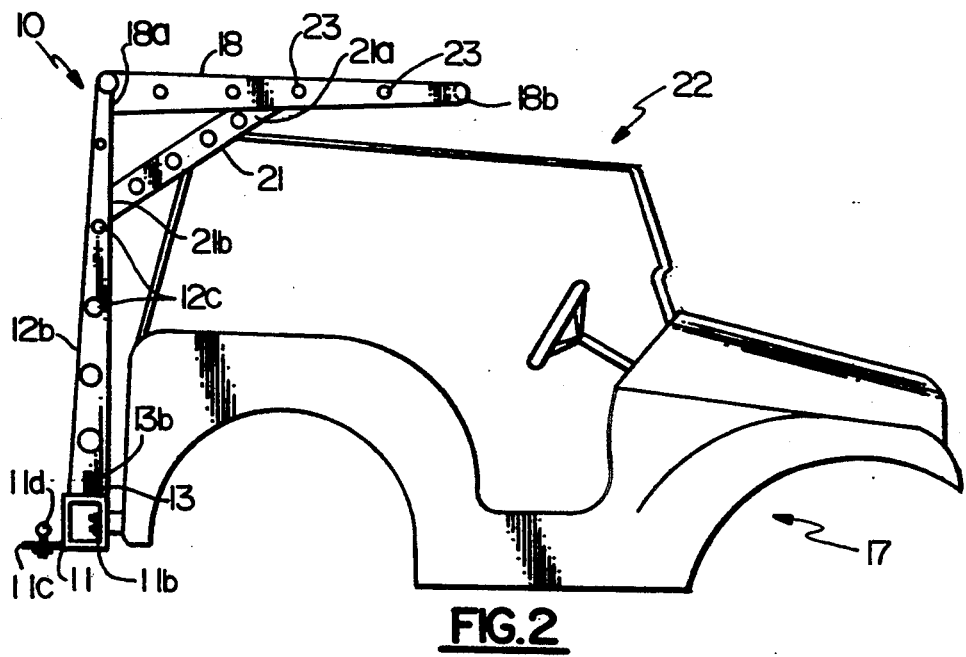

5,381,939

VEHICLE CARGO CARRIER

BACKGROUND OF THE INVENTION

1. Field of the Invention

The present invention, in general, relates to luggage carrying devices used to transport cargo in cooperation with a motor vehicle and, more particularly, to elevated types of vehicle cargo carriers.

Elevated types of cargo carriers are also commonly known as "car top carriers", and the terms are used interchangeably herein to refer to any type of a structure that is used in cooperation with a passenger motor vehicle and is useful for attaching cargo items thereto. Car top carriers, in general, include well known types of luggage racks for use with passenger types of vehicles and with pickup trucks that are attached to the vehicle where convenient, and are often elevated above the roof of the vehicle or above the bed of the pickup truck.

Car top carriers are devices that are useful for the transportation of cargo items that are either too large to fit within the trunk of a vehicle, inside the bed of a pickup truck, or inside the passenger compartment of the vehicle. Also, the space that is provided for the storage of cargo items is severely limited for some types of vehicles, and accordingly, the car top carrier provides a cargo storage area that is necessary for the transportation of even small amounts of cargo. The cargo items are typically placed upon the car top carrier where they are fastened thereto and are thus transported.

Many common types of car top carriers rely upon a clamp of some sort to attach the more common types of car top carriers to the gutter rail of the vehicle. However, convertible and convertible sport utility types of vehicles such as the JEEP brand "WRANGLER" model, SUZUKI brand "SAMURAI" model, GEO brand "TRACKER" model, ISUZU brand "AMIGO" model, and other types of convertible, or "soft-top" vehicles as they are also generally referred to, are difficult to attach a car top luggage carrier to.

Many of the prior types of car top carriers for passenger vehicles, including convertibles, tend to be limited in their cargo carrying capacity, restrict the visibility by the driver to see other hazards or restrict other drivers from seeing the tail lights of the vehicle having the prior type of luggage rack attached, significantly increase wind resistance, or they are considered by some to be aesthetically lacking in appeal.

In addition the range of usage for many of the prior types of car top carriers for soft-top vehicles is limited to a specific purpose such as to transport either small luggage items such as suitcases or skis or alternatively larger items such as canoes, ladders, bicycles, and other like types of cargo.

Certain prior types of cargo racks for pickup trucks also tend to be restrictive as to the load carrying capacity and types of items to be supported, or they do not accommodate pickup trucks which include a camper top type of enclosure over the pickup truck bed area or which include front or side mounted tool boxes. In particular typical contractor usage of pickup trucks often requires that both fragile as well as heavy cargo items be placed together on the bed of the pickup truck.

Similar disadvantages regarding load carrying capacity and the types of items that can be carrier by the car top carrier are also associated with some of the prior types of cargo racks that are used with station wagons, sedans, and other types of passenger vehicles.

Accordingly there exists today a need for an improved vehicle cargo carrier that has an adequate cargo carrying capacity, is versatile, does not restrict visibility excessively, does not increase wind resistance excessively, is adaptable for use with a wide variety of passenger vehicle body types including sedans, station wagons, pickup trucks, convertibles, and is aesthetically appealing. A vehicle cargo carrier that allows for the segregated loading of heavy cargo items apart from fragile cargo items is a useful device for all vehicle types including for use with pickup trucks.

2. Description of Prior Art

Vehicle cargo carriers and luggage racks are, in general, known. For example, the following patents describe various types of these devices:

U.S. Pat. No. 2,492,841 to Burkey, Dec. 27, 1949;
U.S. Pat. No. 2,643,040 to Hare, Jun. 23, 1953;
U.S. Pat. No. 2,779,524 to Carlson, Jan. 29, 1957;
U.S. Pat. No. 3,260,929 to Hedgepeth, Jul. 12, 1963; and
U.S. Pat. No. 4,538,752 to Welter, Sep. 3, 1985.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an important object of the present invention to provide an improved vehicle cargo carrier that is adaptable for use with a wide variety of passenger vehicle types.

It is also an object of the invention to provide an improved vehicle cargo carrier with a cargo carrying capacity that is matched to the gross vehicle weight rating (GVWR) of each vehicle for which it is designed to be used.

Another object of the invention is to provide an improved vehicle cargo carrier that is versatile in its ability to accept cargo items of varying size and type.

Still another object of the invention is to provide an improved vehicle cargo carrier that does not restrict the visibility of the driver of the vehicle excessively.

Yet another object of the invention is to provide an improved vehicle cargo carrier that does not excessively restrict the visibility of the taillights of the vehicle upon which it is attached.

Still yet another object of the invention is to provide an improved vehicle cargo carrier that is generally considered to be aesthetically appealing.

Still yet a further important object of the invention is to provide an improved vehicle cargo carrier that is easy to install and to remove from the vehicle.

Still yet another important object of the invention is to provide an improved vehicle cargo carrier that does not excessively increase wind resistance, and correspondingly, does not excessively increase fuel consumption.

Still yet another most important object of the invention is to provide an improved vehicle cargo carrier that does not require drilling holes into the body of the vehicle in order to attach the car top carrier to the vehicle.

Briefly, an improved vehicle cargo carrier for use with vehicles that is constructed in accordance with the principles of the present invention includes a supporting rear bumper having two upright supporting members attached thereto at a first end of each upright supporting member and extending to a predetermined height above the supporting bumper and including a connecting cross member that is attached between each of the two upright members at a second end of each of the two upright members. A pair of upper support members are included wherein a first end of each of the upper support members is attached to each of the two upright members at the second end thereof. Each of the two upper support members is cantilevered out from the two upright members and extends longitudinally toward the front of the vehicle for a predetermined length. A front connecting cross member is attached between each of the two upper support members at a second end thereof. The connecting cross member, the two upper support members, and the front connecting cross member define in general a rectangular plane that is elevated above the rear supporting bumper by the height of the two upright supporting members. According to a modification, a luggage rack is provided as an optional component that is attachable to and detachable apart from the improved car top carrier.

BRIEF DESCRIPTION OF THE DRAWINGS

FIG. 1 is a view in perspective of an improved vehicle cargo carrier.

FIG. 2 is a side view of an improved vehicle cargo carrier adapted for use with a soft top type of sport utility vehicle.

FIG. 4 is a view in cross section of a clamp useful to attach the luggage rack to the improved vehicle cargo carrier.

DETAILED DESCRIPTION OF THE INVENTION

Figure 3:
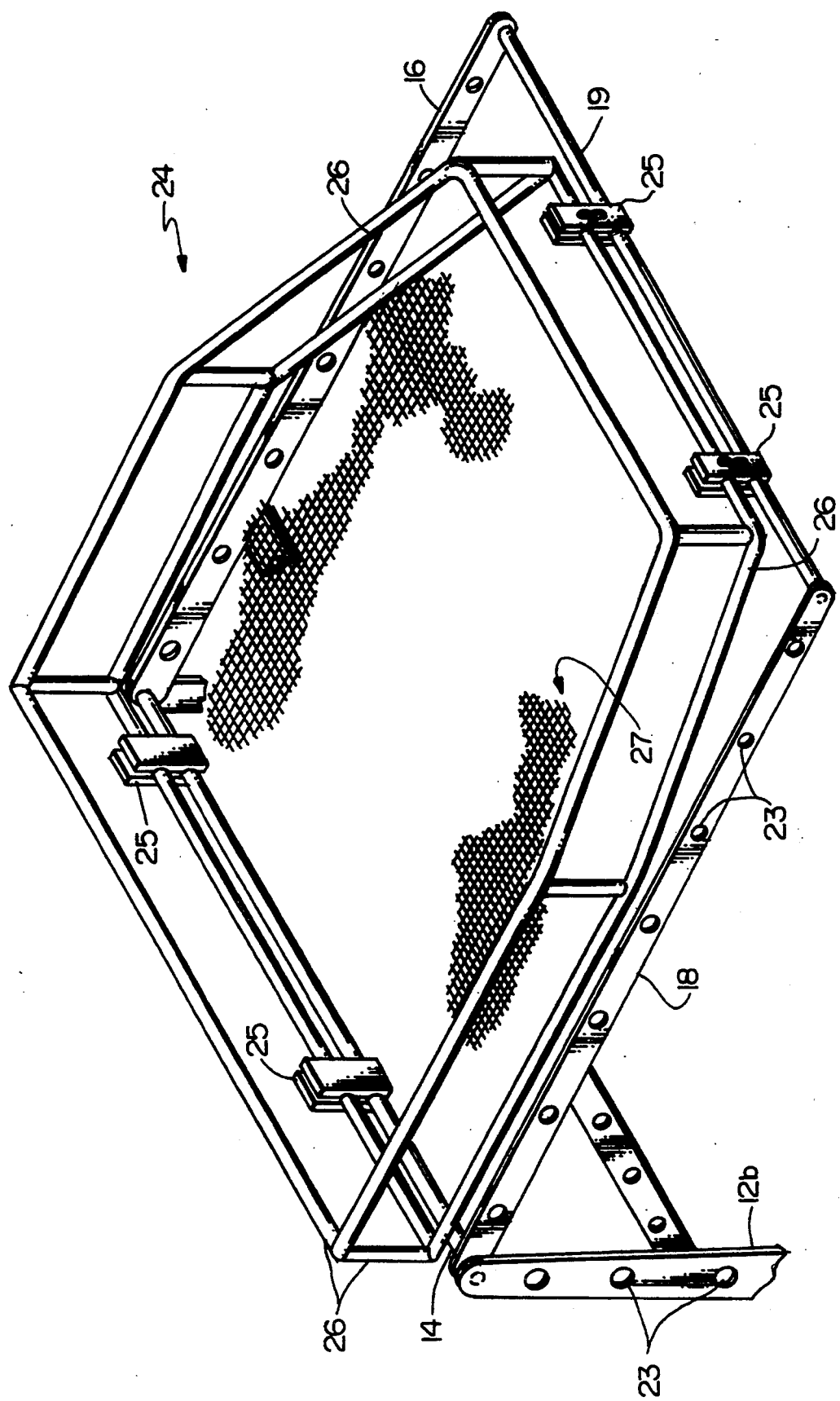
FIG. 3 is a view in perspective of a luggage rack that is adapted for mounting to the improved vehicle cargo carrier.

Referring primarily to FIG. 1 and occasionally to FIG. 2, is shown, an improved vehicle cargo carrier, identified in general by the reference numeral 10. The improved vehicle cargo carrier 10 is modified, as described hereinbelow, to adapt it for use with passenger types of vehicles including convertible, soft-top, sedan, station wagon, and pickup trucks. The terms "convertible" and "soft-top" are used interchangeably throughout this specification to refer to any type of passenger vehicle not having a metal, or equivalent type of solid roof.

Details of the vehicle are omitted from the FIG. 1 drawing to provide improved clarity of construction of the improved vehicle cargo carrier 10.

The improved vehicle cargo carrier 10 as shown in FIG. 2 is in particular adapted for use with soft-top sport-utility types of vehicles such as the JEEP brand "WRANGLER" and the SUZUKI brand "SUMARAI" models or for use with other similar types of vehicles. Modifications are made to any of the component parts, as are described in greater detail hereinbelow, of the improved vehicle cargo carrier 10 to adapt it for use with other vehicle types (not shown) as desired.

A supporting bumper 11 is provided that is adapted to replace the original equipment rear mounted bumper (not shown) that is furnished with each particular vehicle when the improved vehicle cargo carrier 10 is installed as an "after-market" accessory item, usually after the sale of the vehicle has occurred. The supporting bumper 11 is factory installed as original equipment or is installed by the new car dealer, when preferred, and serves as the original equipment bumper in those particular instances. However the specification hereinbelow describes the installation of the supporting bumper 11, and of the improved vehicle cargo carrier 10 in general, as if it were an after-market consumer installed accessory.

The supporting bumper 11 attaches to the rear of the frame of the vehicle (not shown) in like manner as the original equipment rear bumper is attached. Normally the original equipment bumper is bolted to the frame (not shown) or is bolted to a bracket (not shown) that in turn is bolted to the frame, and the supporting bumper 11 is similarly bolted to the frame or to the bracket after the original equipment bumper has first been removed apart from the vehicle.

For example, when the improved vehicle cargo carrier 10 is adapted for use with the JEEP brand "WRANGLER utility vehicle" model, bumper holes 11a are provided in the supporting bumper 11 to allow access to a plurality of bumper bolts 11b that are used to secure the supporting bumper 11 to the frame (not shown) of the Jeep vehicle.

A trailer ball plate 11c is provided, as desired, and is used for attaching a hitch ball 11d thereto, or alternatively, a receiver type of hitch (not shown) adapted for receiving a drawbar (not shown) is included as a part of the supporting bumper 11.

Supporting bumper holes 11e are provided as desired in the supporting bumper 11 to lessen the weight of the supporting bumper 11 and for improving aesthetic appeal. Care is taken to ensure that the supporting bumper holes 11e do not excessively weaken the supporting bumper 11.

The supporting bumper 11 is preferably constructed of square or rectangular tubing, although round or other shaped tubing is used as desired. The supporting bumper 11 is constructed of a predetermined length and as having a contour that is adapted to the particular vehicle upon which the supporting bumper 11 is to be attached. For example the supporting bumper 11, as shown, is constructed of straight stock rectangular tubing of approximately the same overall length as is the original equipment bumper which it replaces for most types of vehicles.

However the one supporting bumper 11 that is used with the JEEP brand "WRANGLER utility" model replaces two rear bumperettes (not shown) as are presently included on many of the JEEP brand "WRANGLER utility vehicle" models. The two rear bumperettes, each of which resembles a small bumper, are removed and the one supporting bumper 11 is installed by using the desired mounting bolt holes that both of the bumperettes had previously used.

All of the component parts of the improved vehicle cargo carrier 10 are each modified as desired to better adapt them for use with each intended vehicle for which they are to be used. Throughout the specification are disclosed certain of those modifications as may not be considered obvious. Changes pertaining to the length, shape, thickness, contour, materials used, finish applied (such as chrome plate or paint, for example), and regarding similar other design selectable variables are not described for each of the component parts disclosed herein, as these types of changes are anticipated as being obvious to those thus having obtained the benefit that is provided by this specification.

Attached to the supporting bumper 11 are included a first upright member 12a and a second upright member 12b, each being disposed at a predetermined spaced apart relationship with respect to each other and each extending generally upwards in a direction that rises above the roof height of the vehicle. The distance between the first and second upright members 12a, 12b is predetermined to accommodate the load carrying attributes as desired for the improved vehicle cargo carrier 10 and also to allow for minimum obstruction, and therefore maximum visibility by other drivers, of the taillights (not shown) of the vehicle to which the improved vehicle cargo carrier 10 is attached.

The first and second upright members 12a, 12b are each constructed so as to be capable of supporting the anticipated maximum cargo load for which the improved vehicle cargo carrier 10 is designed to accommodate and of withstanding the associated forces encountered during acceleration, cornering, braking, and the like. For certain vehicle installations, the use of flat plate stock, as shown, is anticipated for construction of the first and second upright members 12a, 12b. The maximum gross vehicle weight rating of each vehicle is taken into account during the design of each particular improved vehicle cargo carrier 10.

Upright member holes 12c are provided, as desired, to lessen the weight of each of the first and second upright members 12a, 12b and to improve, in general, the aesthetics of the improved vehicle cargo carrier 10, as well as to coordinate the appearance of the first and second upright members 12a, 12b with the appearance of the supporting bumper holes 11e that are located in the supporting bumper 11.

An upright member base plate 13 is attached to each of the first and second upright members 12a, 12b at an end of the first and second upright members 12a, 12b that is closest to where they are each attached to the supporting bumper 11. Each of the upright member base plates 13 is attached to the supporting bumper 11 by a quantity of gusset plate bolts 13a, or by welding these components together, as desired. The upright member base plates 13 provide increased strength and structural integrity to the first and second upright members 12a, 12b where they are attached to the supporting bumper 11. A gusset 13b is provided, as is necessary, between each of the first and second upright members 12a, 12b and each of the upright member base plates 13 for added strength.

According to a modification, modified upright members (not shown) are included which are curved in shape as desired to provide the necessary clearance of a vehicle tailgate (not shown), a rear window opening (not shown), or to allow for better visibility of the vehicle taillights.

For certain particular types of vehicles, it is anticipated that an extension bracket (not shown) will be used that attaches to the supporting bumper 11. The extension bracket is designed generally to have an upside down "U" overall shape and will allow for the attachment of the modified upright members thereto at a height that is elevated above the supporting bumper 11 by the height of the extension bracket. The extension bracket provides an alternative method to allow for clearance of the tailgate and rear window opening with respect to the modified upright members, and also to allow for better visibility of the vehicle taillights.

The specification discloses the preferred manner by which certain of the component parts of the improved vehicle cargo carrier 10 are attached to certain other of the component parts, or, are attached directly to the vehicle. Other ways are anticipated for the attachment of all of the component parts to each other or to the vehicle structure and include, either attachment by the use of a bolt, or by a bolt and a nut, or by a retaining pin, or by a clevis type of arrangement, or by welding the parts together, or by other methods as are generally known.

Therefore when the term "attached" is used throughout the specification, it is intended to include either attachment by welding, attachment by the use of a bolt (or bolts) engaging and cooperating with bolt threads that are provided in either another of the component parts or in the vehicle, attachment by the use of bolts and nuts generally, attachment by retaining pin, or attachment by clevis, or by other forms of attachment as are generally known in the art.

A connecting member 14 having a first end 14a and a second end 14b is disposed longitudinally between the first and second upright members 12a, 12b. The connecting member 14 is attached at the first and second ends 14a, 14b thereof to the end of each of the first and second upright members 12a, 12b that is located furthest away from the supporting bumper 11. The preferred shape for the material that is used for construction of the connecting member 14 is generally a round type of tubing stock.

The connecting member 14 is attached at each of the first and second ends 14a, 14b to the first and second upright members 12a, 12b by welding or by any fastening method that is preferred.

A second connecting member 15 is shown in dashed lines in the FIG. 1 drawing situated parallel to and somewhat below the connecting member 14, and is similarly attached to both of the first and second upright members 12a, 12b. The second connecting member 15 is used only where required to provide increased strength to the improved vehicle cargo carrier 10 necessary to satisfy heavy cargo load requirements.

A first upper support member 16 is attached at a first upper support member end 16a to the first upright member 12a at the end of the first upright member 12a that is located furthest away from where the first upright member 12a is attached to the supporting bumper 11. The first upper support member 16 is cantilevered away from the first upright member 12 and extends longitudinally toward the front of a vehicle (Identified, in general, as reference numeral 17, FIG. 2.) for a length that is predetermined for each particular vehicle type. The first upper support member 16 is disposed substantially perpendicular with respect to both the first upright member 12a and the connecting member 14.

A second upper support member 18 is attached at a second upper support member end 18a to the second upright member 12b at the end of the second upright member 12b that is located furthest away from where the second upright member 12b is attached to the supporting bumper 11. The second upper support member 18 is cantilevered away from the second upright member 12b and extends longitudinally toward the front of the vehicle 17 for a length that is approximately the same as that of the first upper support member 16, of which the second upright member 18 is generally parallel with.

A first upper support member remaining end 16b is attached to a front connecting member 19 at one end thereof and the front connecting member 19 is attached at the other end thereof to a second upper support member remaining end 18b. The front connecting member 19 is parallel with the connecting member 14, is usually formed of a similar type of material stock, and is on the same plane thereof. The front connecting member 19 is disposed a predetermined distance away from the connecting member 14 that is approximately equal to the length of either the first upper support member 16 or the second upper support member 18.

The first upper support member 16, the front connecting member 19, the second upper support member 18, and the connecting member 14 define in general a rectangular plane that is useful for placing a variety of cargo items thereon. Boats, canoes, plywood, lumber, ladders, and other like types of cargo items, none of which are shown, are placed on these component parts as desired and are secured thereto by methods well known to the art.

A first gusset member 20 is attached at a first member end 20a to the first upper support member 16 at a location that is a predetermined distance away from the first upper support member end 16a and is attached at a second member end 20b to the first upright member 12a at a location that is a predetermined distance away from where the first upper support member end 16a is attached to the first upright member 12a.

A second gusset member 21 is attached at a second gusset member end 20a to the second upper support member 18 at a location that is a predetermined distance away from the second upper support member end 18a and is attached at a second gusset member remaining end 20b to the second upright member 12b at a location that is a predetermined distance away from where the second upper support member end 18a is attached to the second upright member 12b.

The first gusset member 20 and the second gusset member 21 provide additional support to the first upper support member 16 and to the second upper support member 18, thereby increasing the load carrying capacity as desired. Accordingly, the first gusset member 20 and the second gusset member 21 are not required for every adaptation of the improved vehicle cargo carrier 10.

Referring primarily to FIG. 2, the first upper support member 16, the front connecting member 19, the second upper support member 18, and the connecting member 14 are, in general, elevated above a roof (Identified, in general, by the reference numeral 22.) a distance that is determined by the length of the first and the second upright members 12a, 12b. The roof 22, as shown, is a convertible or a soft-top type that is shown in the raised position.

The first gusset member 20 and the second gusset member 21 are disposed a predetermined distance apart from each other to provide sufficient clearance for the roof 22 to pass between the first gusset member 20 and the second gusset member 21. The roof 22 does not interfere with any of the component parts of the improved vehicle cargo carrier 10 when the roof is in the raised position, nor when the roof is lowered into the convertible "top-down" position (not shown).

The improved vehicle cargo carrier 10 is adapted for used with convertible, sedan, pickup truck, station wagon, van, and other types of passenger vehicles by varying any of the described component parts as desired.

When the improved vehicle cargo carrier 10 is adapted for use with either a pickup truck (not shown), van, or station wagon, the loading of cargo items is accomplished on the plane for loading that is normally provided by a vehicle cargo surface (not shown) such as on the bed (not shown) of a pickup truck and also on the elevated plane that is provided by the first upper support member 16, the front connecting member 19, the second upper support member 18, and the connecting member 14 of the improved vehicle cargo carrier 10.

The first upper support member 16, the second upper support member 18, the first gusset member 20, and the second gusset member 21 are provided with weight reducing holes 23 as desired to reduce the weight of these component parts and also to improve the aesthetics of the improved vehicle cargo carrier 10 in general.

Referring now to FIG. 3 is shown a luggage carrier identified in general by the reference numeral 24 that is adapted for use with the improved vehicle cargo carrier 10. The luggage carrier 24 is attachable to and detachable apart from the front connecting member 19 and the connecting member 14 of the improved vehicle cargo carrier 10 by the use of clamps, identified in general by the reference numeral 25, and as is shown in greater detail in FIG. 4.

The luggage carrier 24 includes a supporting frame 26 structure having a predetermined size and shape. An expanded metal type of a grate 27 is preferred for use as a floor to rest cargo items, such as a suitcase (not shown) upon, as it does not collect rain water although other materials that are known to the art are also anticipated for use as a flooring. The clamps 25 are used to secure the luggage carrier 24 to the front connecting member 19 and to the connecting member 14 where desired.

Specialty types of luggage carriers (not shown) are anticipated for use with the improved vehicle cargo carrier 10 including, but not limited to, specialty types of luggage carriers that are adapted for receiving bicycles, skis, and the like. Certain of these specialty luggage carriers (not shown) attach to the top of the improved vehicle cargo carrier 10 similar to the manner in which the luggage carrier 24 is attached thereto.

Certain other of these specialty luggage carriers (not shown) attach instead directly to the first and second upright members 12a, 12b, as preferred. For example, a bicycle type of carrier (not shown) is anticipated to be attachable directly to the first and second upright members 12a, 12b.

Referring now primarily to FIG. 4 is shown in greater detail construction of the clamp 25. The clamp 25 includes a first clamp half 28 and a second clamp half 29. The first clamp half 28 includes a clearance hole 30 that is provided to allow a clamp wing bolt 31 to pass therein. The clamp wing bolt 31 engages with clamp threads 32 that are provided in the second clamp half 29.

As the clamp wing bolt 31 is tightened, the second clamp half 29 is urged closer toward the first clamp half 28 thereby bearing against the supporting frame 26 and also against either the front connecting member 19, or the connecting member 14, whichever is situated therein, thereby securing the supporting frame 26 in position with respect to the front connecting member 19 and the connecting member 14.

The invention has been shown, described and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A vehicle cargo carrier structure for use with a vehicle, comprising:
    (a) a replacement supporting bumper having a predetermined size and shape adapted to be attached to a rear support of said vehicle, and a pair of upright members, said replacement supporting bumper adapted for attaching said pair of upright members in a substantially vertical position and being sufficiently rigid to hold said upright members in said substantially vertical position when said cargo carrier is loaded thereto and being sufficiently rigid to hold said upright members in said substantially vertical position when said cargo carrier is loaded;
    (b) said pair of upright members having a predetermined size and shape, means for holding said pair of upright members stationary with respect to said supporting bumper at a predetermined spaced apart relationship with respect to each other and extending to a predetermined height above said supporting bumper;
    (c) a connecting member having a predetermined size and shape attached at each end thereof to an end of each of said pair of upright members that is opposite to where said pair of upright members are attached to said supporting bumper;
    (d) a pair of upper support members, each of said pair of upper support members having a predetermined size and shape and having a first end and a second end and having said first end attached to an end of each of said pair of upright members that is opposite to where said pair of upright members are attached to said supporting bumper and extending longitudinally toward the front of said vehicle and substantially perpendicular to said pair of upright members, means for holding said pair of upper support members stationary with respect to said pair of upright members such that said second ends of said pair of upper support members remain free of attachment to said vehicle; and
    (e) a front connecting member having a predetermined size and shape, and having two ends and being attached at each of said two ends to said pair of upper support members at said second end thereof and said front connecting members being disposed substantially perpendicular with respect to each of said upper support members and being disposed substantially parallel with respect to said connecting member;
    whereby said pair of upper support members, said connecting member, and said front connecting member define an area that is cantilevered with respect to said pair of upright members, said area being disposed so as to extend above a portion of a roof of said vehicle, said area being supported over said roof by said pair of upright members, and said area being adapted to receive and to support a cargo placed thereon.

2. The vehicle cargo carrier of claim 1 wherein said pair of upright members includes means for detachably attaching said pair of upright members to said supporting bumper.

3. The vehicle cargo carrier of claim 1 including luggage rack adapted for attachment to said area that is cantilevered of said vehicle cargo carrier structure.

4. The vehicle cargo carrier of claim 3 including clamp means for attaching said luggage rack to said vehicle cargo carrier structure.

5. The vehicle cargo carrier of claim 1 wherein said connecting member includes a plurality of connecting members.

6. The vehicle cargo carrier of claim 1 wherein said supporting bumper includes means for providing a hitch attached thereto adapted for fastening a trailer hitch thereto.

7. The vehicle cargo carrier of claim 1 wherein said means for holding said pair of upper support members includes a gusset member, said gusset member attached at one end of said gusset member to one of said pair of upper support members and attached at remaining end of said gusset member one of said pair of upright members.

8. The vehicle cargo carrier of claim 7 wherein said gusset member includes a plurality of gusset members.

9. The vehicle cargo carrier of claim 1 including means to secure a cargo item thereto.

10. A vehicle cargo carrier for the transportation of a cargo, comprising:
    (a) a replacement supporting bumper having a predetermined size and shape adapted to be means for holding said upright member stationary in a substantially vertical position with respect to a rear bumper support of a vehicle;
    (b) an upright member having a predetermined size and shape attached to said supporting bumper and extending to a predetermined height above said supporting bumper, said supporting bumper being sufficiently rigid to hold said upright member in said substantially vertical position when said carrier is loaded; and
    (c) an upper support member having a predetermined size and shape and having a first end and a second end and having said first end attached to an end of said upright member that is opposite to where said upright member is attached to said supporting bumper and having said upper support member cantilevered with respect to said upright member so as to extend over a portion of a roof of said vehicle and substantially perpendicular to said upright member, means for holding said upper support member stationary with respect to said upright member such that said second end of said upper support member remains free of attachment to the vehicle;
    whereby said upper support member defines an area that is adapted to receive said cargo thereon.

11. The vehicle cargo carrier of claim 10 wherein said upright member includes means for detachably attaching said upright member to said supporting bumper.

12. The vehicle cargo carrier of claim 10 including luggage rack adapted for attachment to said vehicle cargo carrier.

13. The vehicle cargo carrier of claim 10 wherein said supporting bumper includes means for providing hitch attached thereto adapted for fastening a trailer hitch thereto.

* * * * *